United States Patent
Świrniak et al.

(10) Patent No.: US 12,117,096 B2
(45) Date of Patent: Oct. 15, 2024

(54) CAP ASSEMBLY

(71) Applicant: B/E Aerospace, Inc., Winston-Salem, NC (US)

(72) Inventors: Pawel Świrniak, Wroclaw (PL); Dariusz Homa, Gliwice (PL)

(73) Assignee: B/E AEROSPACE, INC., Winston Salem, NC (US)

( * ) Notice: Subject to any disclaimer, the term of this patent is extended or adjusted under 35 U.S.C. 154(b) by 226 days.

(21) Appl. No.: 17/900,184

(22) Filed: Aug. 31, 2022

(65) Prior Publication Data
US 2023/0081636 A1  Mar. 16, 2023

(30) Foreign Application Priority Data

Sep. 6, 2021 (EP) ..................................... 21461585

(51) Int. Cl.
| | |
|---|---|
| *F16K 11/02* | (2006.01) |
| *F16K 31/524* | (2006.01) |
| *F16K 31/60* | (2006.01) |
| *F16L 55/115* | (2006.01) |

(52) U.S. Cl.
CPC ........ *F16K 31/52441* (2013.01); *F16K 11/02* (2013.01); *F16K 31/605* (2013.01); *F16L 55/1155* (2013.01); *F16L 2201/60* (2013.01); *F16L 2201/80* (2013.01)

(58) Field of Classification Search
CPC .. F16K 31/52441; F16K 11/02; F16K 31/605; F16L 2201/60; F16L 2201/80; F16L 55/1155
See application file for complete search history.

(56) References Cited

U.S. PATENT DOCUMENTS

| | | | |
|---|---|---|---|
| 2,831,498 A | 4/1958 | Thomsen | |
| 3,831,628 A * | 8/1974 | Kintner | F16K 15/036 137/527 |
| 4,079,751 A * | 3/1978 | Partridge | F16K 15/035 137/527 |
| 4,196,745 A * | 4/1980 | Schutzer | F16K 27/0227 137/527 |

(Continued)

OTHER PUBLICATIONS

European Search Report for Application No. 21461585.8, mailed Feb. 21, 2022, 6 pages.

*Primary Examiner* — Matthew W Jellett
*Assistant Examiner* — Christopher D Ballman
(74) *Attorney, Agent, or Firm* — CANTOR COLBURN LLP

(57) ABSTRACT

A cap assembly includes two caps each pivotable about an axis of a respective pivot rod between an open position and a closed position, the two pivot rods arranged adjacent each other with parallel pivot axes (B) to define a hinge region, each cap having a pivot end extending into the hinge region between the two pivot rods; and a common pivot mechanism arranged to push against the pivot ends, in response to actuation of the pivot mechanism, to pivot the caps substantially simultaneously to the closed position, the common pivot mechanism comprising: a lever; a cam in connection with the lever and located in the hinge region such that actuation of the lever causes movement of the cam in the hinge region along the direction of the pivot axes; a plunger located in the hinge region between the cam and the pivot ends.

15 Claims, 4 Drawing Sheets

(56) References Cited

U.S. PATENT DOCUMENTS

| | | | | |
|---|---|---|---|---|
| 4,445,533 A * | 5/1984 | DeFrees | ................ | F16K 15/035 |
| | | | | 137/515.7 |
| 4,607,661 A | 8/1986 | Wessels et al. | | |
| 5,244,011 A * | 9/1993 | Feldinger | .............. | F16K 1/2021 |
| | | | | 137/862 |
| 7,311,740 B2 * | 12/2007 | Williams | .............. | F16K 15/038 |
| | | | | 137/527 |
| 7,406,983 B2 * | 8/2008 | Schwartz | ............. | F16K 1/2021 |
| | | | | 251/298 |
| 8,123,196 B1 * | 2/2012 | Chernoff | ........... | F16K 31/52441 |
| | | | | 251/335.1 |
| 9,241,604 B2 * | 1/2016 | Dries | .................. | A47L 15/4223 |
| 9,273,449 B2 | 3/2016 | Burd | | |
| 10,539,244 B2 * | 1/2020 | Solarz | ................ | F16K 27/0209 |
| 10,612,690 B2 * | 4/2020 | Lesniewski | ........... | F16K 15/038 |
| 11,156,303 B2 * | 10/2021 | Allen | ...................... | F16K 15/18 |
| 11,635,150 B2 * | 4/2023 | Allen | ...................... | E03C 1/104 |
| | | | | 137/512 |
| 11,725,746 B2 * | 8/2023 | Allen | ................... | F16K 17/363 |
| | | | | 137/514 |

\* cited by examiner

CAP ASSEMBLY

CROSS-REFERENCE TO RELATED APPLICATIONS

This application claims priority to European Patent Application No. 21461585.8 filed Sep. 6, 2021, the entire contents of which is incorporated herein by reference.

TECHNICAL FIELD

The present disclosure relates to caps for ports or fittings in fluid systems such as, but not exclusively, water systems.

BACKGROUND

Fluid systems such as water, gas, fuel etc. systems often include ports or fittings for connecting parts of the system to allow the flow of fluid from one part of the system to another. A potable water system, for example, may include a water tank having an inlet port or fitting for connection to a water supply to fill the tank and may have a fitting for connection to an overflow pipe. Many fluid systems have several ports for inlet and/or outlet of the fluid, to which fittings are connected for fluid flow attachment to other parts of the system.

There is often the need to close these fittings at times e.g. when the tank has been filled or the like. In potable water systems on aircraft, for example, the water tank will be filled during ground maintenance, at which time the fittings are open for connection to fill and overflow lines. Once filled, though, and during flight, the fittings will need to be closed. Similarly, in other systems, caps or closures are provided to close fittings as required. The caps are generally configured to provide a fluid tight seal to prevent leakage of fluid from the fitting and also to prevent the ingress of contaminants, dust, foreign bodies etc. into the fitting.

Conventionally, each fitting has a separate cap which needs to be opened or closed manually or automatically.

In some systems, there may be a number of fittings located adjacent each other in the system that operate in synchrony and need to be opened and closed at the same time. Open and closing each cap separately is time intensive and introduces the risk of human error.

The inventors have, therefore, identified a need for a cap assembly allowing for two adjacent fittings to be opened and closed simultaneously more easily and quickly.

SUMMARY

The disclosure provides a cap assembly for two adjacent fittings of a fluid system, comprising two caps that can be opened and closed simultaneously using a single mechanism.

According to one aspect, there is provided a cap assembly comprising: two caps each pivotable about an axis of a respective pivot rod between an open position and a closed position, the two pivot rods arranged adjacent each other with parallel pivot axes to define a hinge region, each cap having a pivot end extending into the hinge region between the two pivot rods; and a common pivot mechanism arranged to push against the pivot ends, in response to actuation of the pivot mechanism, to pivot the caps substantially simultaneously to the closed position, the common pivot mechanism comprising: a lever; a cam in connection with the lever and located in the hinge region such that actuation of the lever causes movement of the cam in the hinge region along the direction of the pivot axes; a plunger located in the hinge region between the cam and the pivot ends of the caps and in engagement with a cam profile surface of the cam, the cam profile having a first section that, when in engagement with the plunger causes the plunger to push against the pivot ends of the caps to pivot the caps to a closed position, and a second section that, when in engagement with the plunger causes the plunger to be out of engagement with the pivot ends of the caps such that a user can rotate the caps about the pivot rods to an open position.

Also provided is a fluid fitting assembly comprising two fluid fittings and a cap assembly as defined above, the assembly mounted to the fittings such that the hinge region is positioned between the two fittings and in the closed position, each cap covers and closes a respective one of the fittings.

The plunger may be provided with a roller arranged to ride the cam profile surface as the cam moves axially in response to actuation of the lever.

A guide structure may be provided to guide movement of the plunger.

The cap assembly may further include a locking mechanism to secure the caps (1) together in the open position. The locking mechanism may comprise complementary latches or the like provided on the caps that lockingly engage together when the caps are in the open position. A spring may be on each pivot rod to bias the caps such that the latches are lockingly engaged.

Markers may provide a visual indication of when the caps are in the open and/or the closed position.

A pin may be provided to secure the lever in the closed position.

BRIEF DESCRIPTION

Examples of an assembly according to this disclosure will be described by way of example only, with reference to the drawings. Other examples may be possible within the scope of the claims.

DETAILED DESCRIPTION

Figure 1:
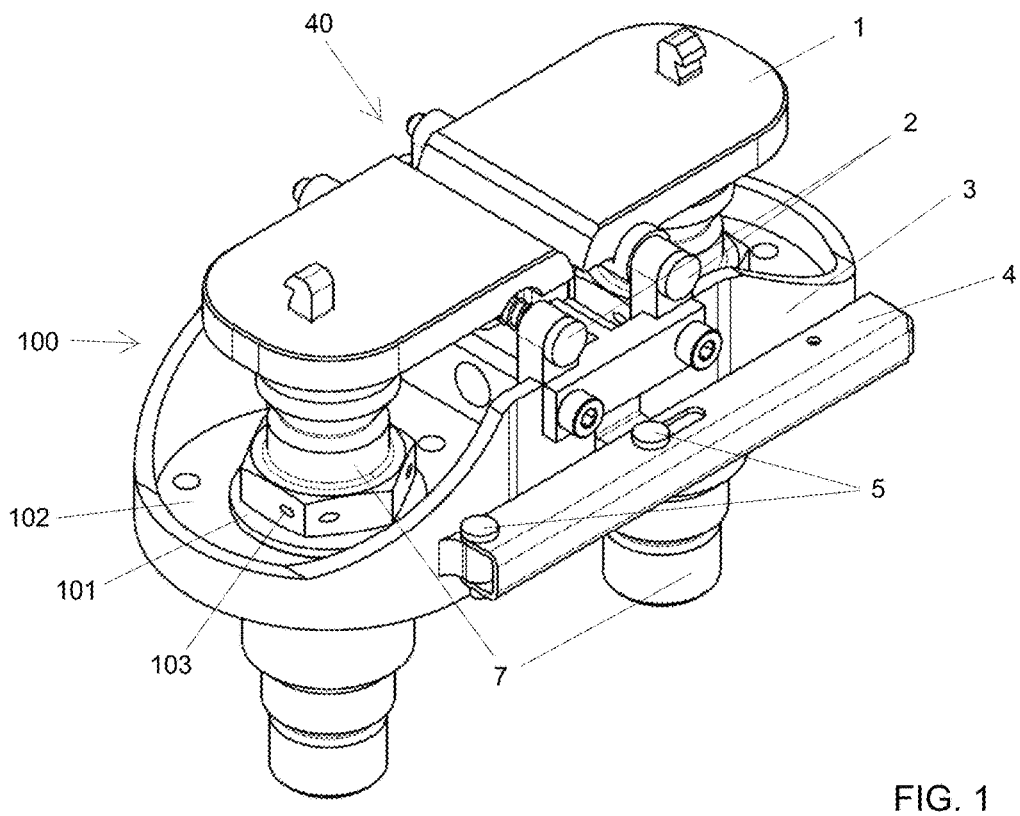
FIG. 1 is a perspective view of a cap assembly according to the disclosure in a closed position.

The following description describes some examples of an assembly according to the disclosure but alternative examples may also fall within the scope of the claims.

In the example shown in the drawings, two fittings 7 are provided side-by-side. In this example, the fittings have a similar structure and size, but the assembly according to the disclosure could also be used for fittings that are not the same size or shape as each other. The cap assembly 100 is mounted over the fittings 7 such that the fittings extend through apertures 101 in a base 102 of the assembly 100.

The assembly and the fittings may be secured by nuts or other fasteners if required, e.g. in vibrational environments. A hole 103 may be provided for a lock wire to prevent the fitting from unscrewing in a vibrational environment.

Figure 2:
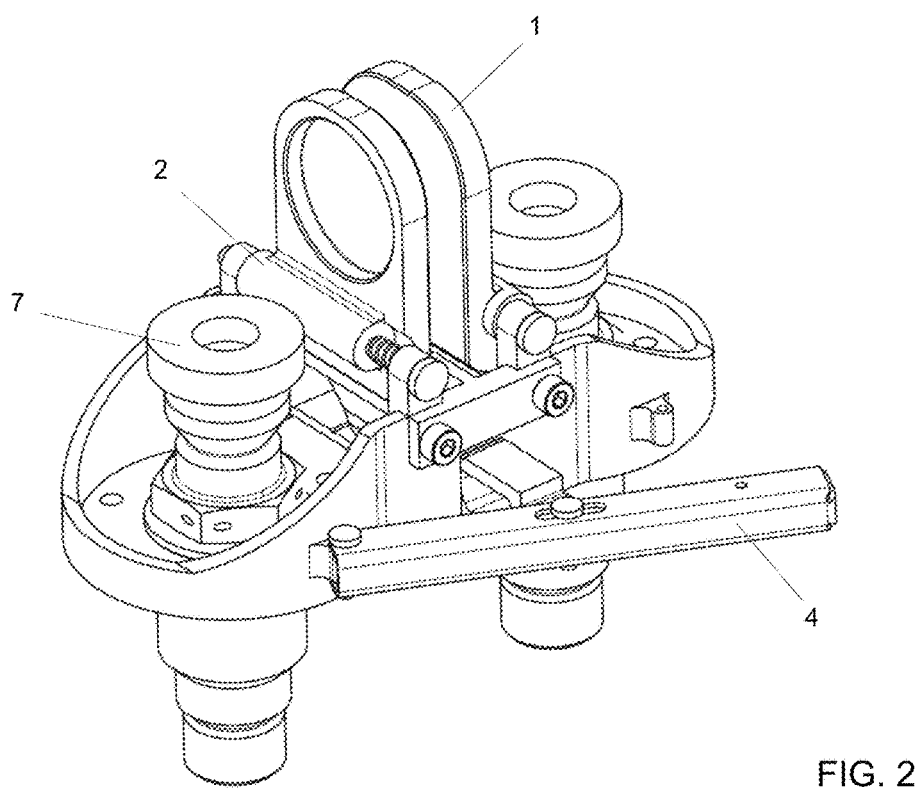
FIG. 2 is a perspective view of a cap assembly according to the disclosure in an open position.

The assembly 100 includes two caps 1, in the form of flaps pivotally mounted in the assembly as will be described further below, to cover and close the fittings, in a closed position (shown in FIG. 1) and to open the fittings when the caps are pivoted to an open position (FIG. 2). The caps 1 are each mounted to a bolt or pin 2 about which it pivots. The rods 2 of the two caps are arranged adjacent to each other in a hinge region 40 of the assembly such that the caps are essentially back-to-back and the axes around which the caps pivot are adjacent and parallel.

Figure 5:
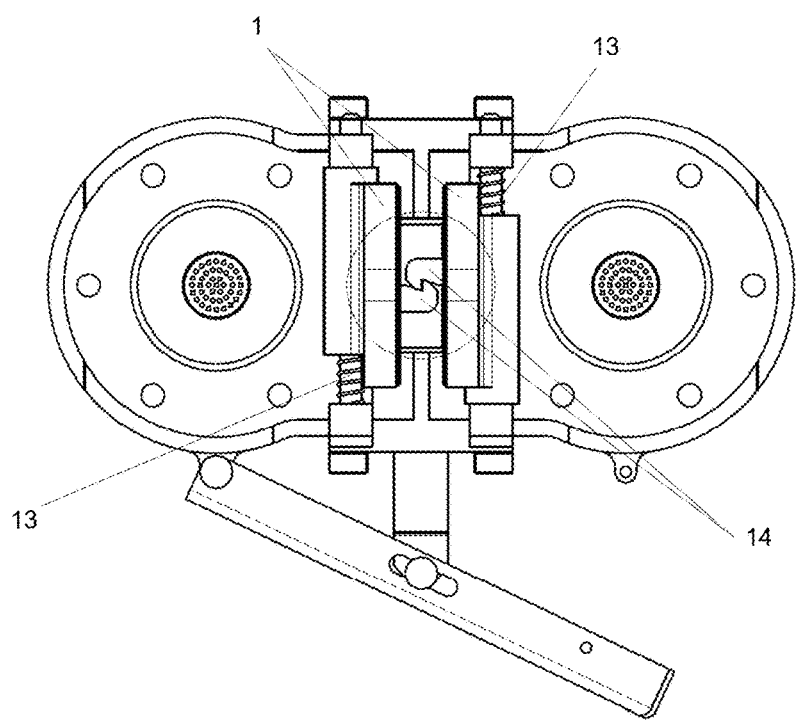
FIG. 5 is a top view of a cap assembly such as shown in FIG. 1, in an open position with the caps latched together.

A locking mechanism e.g. in the form of latches 14 may be provided on the caps to secure the caps to each other in the open position (see e.g. FIG. 5).

A mechanism 50 is provided to pivot the caps 1 between the open and closed positions simultaneously as described further below. The mechanism allows the user, by simple operation of a single lever 4, to open and close both caps 1 at the same time.

Figure 7:
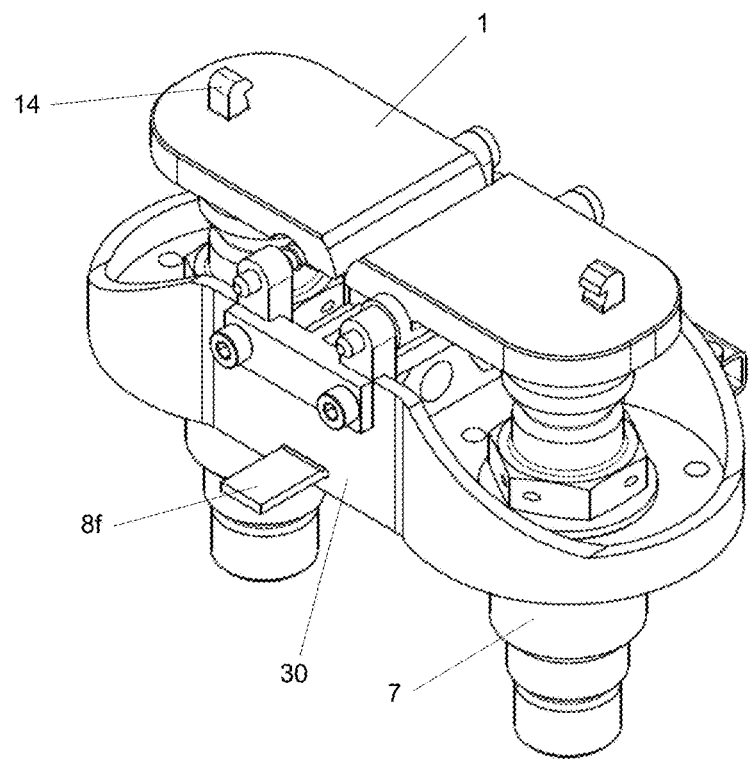
FIG. 7 is a view of the assembly such as shown in FIG. 1, in the closed position, from the reverse side.

The lever 4, which is pivotally mounted on the outside of the assembly 100, for operation by a user, pivots in a plane parallel to the plane along which the axes of the pivot rods 2 extends. The lever 4 is attached to a cam 8 located within the assembly beneath the pivot rods 2 of both caps 1, via a force transfer member such as a pin 5. As the lever 4 is pivoted in a first direction, it causes the connected cam to be withdrawn from the assembly 100 in the direction of the cap pivot rod axes (FIG. 2). Pushing the lever to pivot in the other direction pushes the cam back inwards into the assembly (FIG. 1, FIG. 7). The location of the cam 8 relative to a roller 10 on a plunger 12 arranged to cooperate with the pivot rods 2 determines whether the caps 1 can be opened or closed as described further below.

Figure 3:
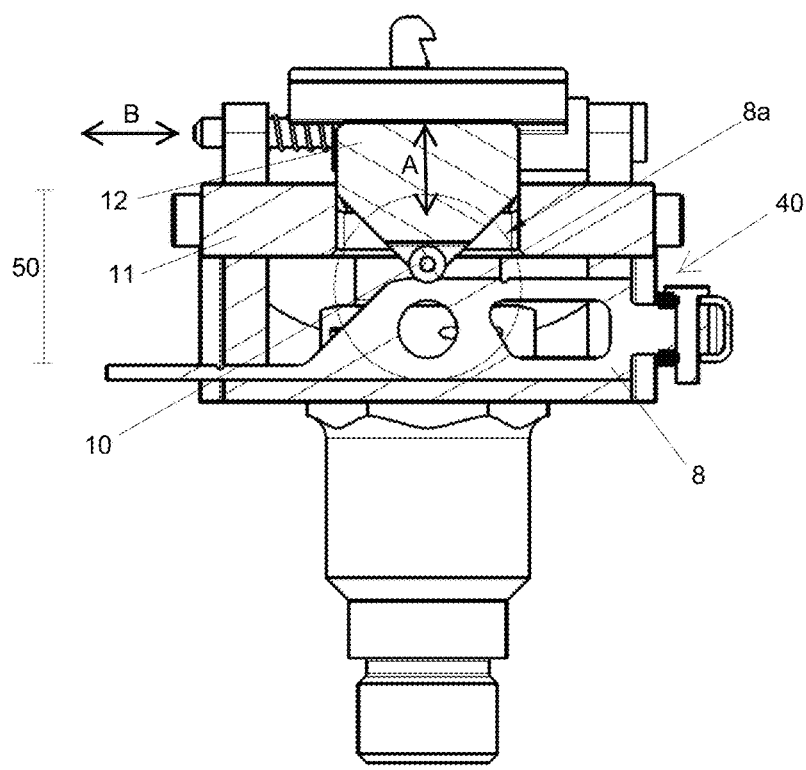
FIG. 3 is a cross-sectional view of a cap assembly such as shown in FIG. 1, in a closed position.
Figure 4:
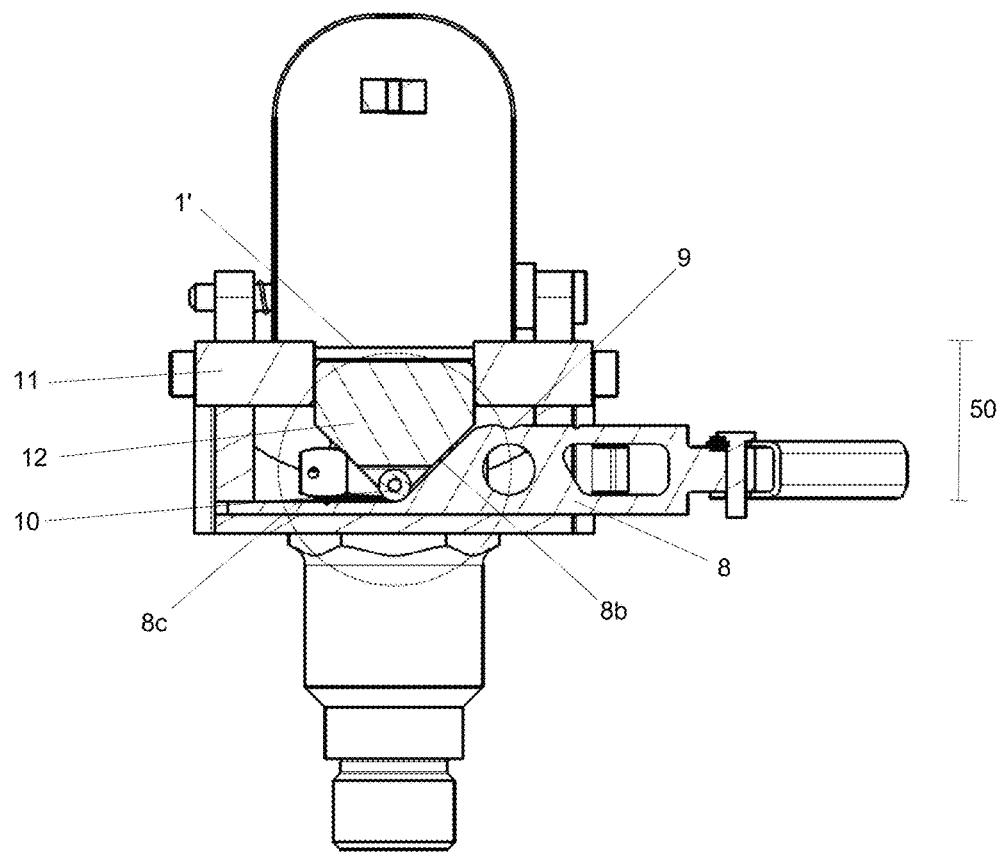
FIG. 4 is a cross-sectional view of a cap assembly such as shown in FIG. 1, in an open position.

The cam 8, roller 10 and plunger 12 mechanism can best be seen in, and described with reference to FIGS. 3 and 4.

The plunger 12 is mounted in the assembly 100 to be movable towards and away from the adjacent ends 1' of the caps 1 that are provided with the pivot rods 2—i.e. to move in a plane, indicated by arrow A, (which direction is transverse to the axial plane (arrow B) of the pivot rods 2). A guide 11 is mounted about the plunger 12 to guide movement of the plunger 12. A roller 10 is mounted to the plunger 12 to engage with and ride the surface of the cam 8 as the cam moves relative to the plunger 12 due to operation of the lever 4.

In the closed position of the lever 4, the cam 8 is positioned with raised surface 8a located beneath the plunger 12 such that the roller 10 contacts that raised surface. The raised surface 8a is dimensioned such that when the roller 10 is in contact with that surface, the plunger 12 pushes against the pivotal ends 1a of the caps 1 causing the caps 1 to pivot about the rods 2 to the closed position (FIG. 1, FIG. 3) covering the fittings 7. The cam profile may be provided with an indentation 9 in which the roller 10 sits when the caps 1 have reached their final closed position and engage with the fittings 7 sufficiently to provide the required sealing. The indentation may be such that a perceptible 'click' is heard by the user when the roller 10 engages in the indentation, so that the user knows that the closing operation is completed. The indentation also ensures that the roller 10 stays in the closed position and cannot be inadvertently moved from the sealed position due to vibrations, gravity etc.

When the lever 4 is moved to the open position (FIG. 2, FIG. 4), the cam 8 is moved relative to the plunger 12 (also in the direction of arrow B) due to force transfer via the pin 5. The cam profile defines a slope 8b which the roller 10 follows at the cam 8 is moved relative to the roller 10 and then has a lower surface 8c against which the roller rests in the open position. In this position, the plunger 12 is, therefore, moved away from engagement with the pivotal ends 1' of the caps 1 thus allowing the caps 1 to be pivoted up towards each other to the open position (FIGS. 2 and 4).

As there is no force from the plunger 12 on the pivotal ends 1a of the caps, the user can then manually flip the caps 1 to the open position.

Figure 6:
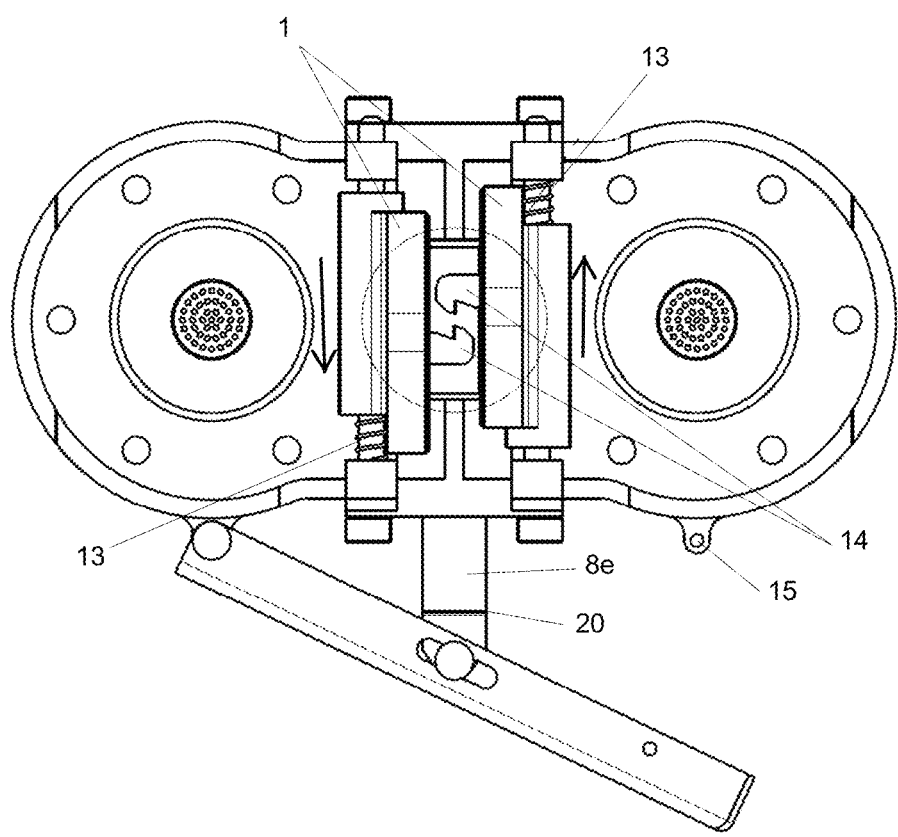
FIG. 6 is a top view of a cap assembly such as shown in FIG. 1, in an open position with the caps unlatched prior to being closed.

In the open position, the caps 1 may be secured together by a locking mechanism e.g. by latches 14 as will be described further below and as is best seen in FIGS. 5 and 6.

Different types of locking mechanisms could be used to secure the caps 1 together in the open position. In some environments, a locking mechanism might not even be necessary and the caps may remain open due to gravity. One type of locking mechanism using matching latches 14 on the two caps 1 is shown in FIGS. 5 and 6. The latches are shaped and positioned on the caps 1 such that when the caps 1 are flipped open and are in back-to-back engagement, the latches 14 engage with each other. In one example, in the open position, the latches 14 are held in engagement by means of a spring force from springs 13 biasing the flaps to a position along the axis of the pivot rods 2 where the latches are secured in locking engagement. Again, if desired, the latches 14 can be structured such that their engagement causes a perceptible 'click'. To release the latches to allow the caps 1 to be closed, the user can apply a manual force to the caps 1 against the bias of the springs 13 (arrows C in FIG. 6) thus disengaging the latches 14.

The user can then close the flaps by pushing the lever 4 as described above. The lever 4 can be secured in the closed position by means of a safety pin 15 engaging the lever 4 to the assembly 100. This prevents the lever from being inadvertently released due to vibrations, gravity etc.

Another useful feature that could be incorporated into the assembly of this disclosure is a marker or indicator to provide a visual indication that the assembly is in the closed or open position. In one example, best seen in FIGS. 5, 6 and 7, a marker may be provided on a part of the cam structure 8 that extends out from the sides of the assembly. A first marker 20 may be provided on part 8e of the cam where it connects to the lever 4. In the open position, this marker is visible (see FIG. 6) to the user outwards from the assembly 100. In the closed position this marker 20 would be located inside the assembly 100 and would not be visible. This may be a sufficient indication—i.e. when the marker 20 is visible, the assembly is open, when the marker 20 is not visible, the assembly is closed. In a further modification, a second marker 30 may be provided either at a different position on the end of the cam connected to the lever 4 or on an opposite end 8f of the cam structure that protrudes from the opposite side of the assembly as seen in FIG. 7. This marker 30 is positioned to be visible outside the assembly 100 when the lever 4 is in the fully closed position. For additional ease of reading, the markers may be provided in different colours or may comprise different words, letters, numbers, symbols etc.

The assembly of this disclosure simplifies the closing of two adjacent fittings using a single mechanism having a lever that reduces the amount of force required by the user to close the caps.

The invention claimed is:

1. A cap assembly comprising:

two caps each pivotable about an axis of a respective pivot rod between an open position and a closed position, the two pivot rods arranged adjacent each other with parallel pivot axes (B) to define a hinge region, each cap having a pivot end extending into the hinge region between the two pivot rods; and a common pivot mechanism arranged to push against the pivot ends, in response to actuation of the pivot mechanism, to pivot the caps substantially simultaneously to the closed position, the common pivot mechanism comprising:

a lever;

a cam in connection with the lever and located in the hinge region such that actuation of the lever causes movement of the cam in the hinge region along the direction of the pivot axes; and a plunger located in the hinge region between the cam and the pivot ends of the caps and in engagement with a cam profile surface of the cam, the cam profile having a first section that, when in engagement with the plunger causes the plunger to push against the pivot ends of the caps to pivot the caps to a closed position, and a second section that, when in engagement with the plunger causes the plunger to be out of engagement with the pivot ends of the caps such that a user can rotate the caps about the pivot rods to an open position.

2. The cap assembly of claim 1, wherein the plunger is provided with a roller arranged to ride the cam profile surface as the cam moves axially in response to actuation of the lever.

3. The cap assembly of claim 1, wherein the first section of the cam profile is a relatively raised section and the second section is a relatively lower section and the first and section sections are separated by a sloping section.

4. The cap assembly of claim 1, wherein the plunger is arranged to move in a direction transverse to the axial direction of the pivot rods responsive to movement of the cam.

5. The cap assembly of claim 1, wherein the lever is arranged to pivot in the plane of the axes of the pivot rods.

6. The cap assembly of claim 1, further comprising a guide structure to guide movement of the plunger.

7. The cap assembly of claim 1, further comprising a locking mechanism to secure the caps together in the open position.

8. The cap assembly of claim 7, wherein the locking mechanism comprises complementary latches provided on the caps that lockingly engage together when the caps are in the open position.

9. The cap assembly of claim 8, further comprising a spring on each pivot rod to bias the caps such that the latches are lockingly engaged.

10. The cap assembly of claim 1, further comprising markers to provide a visual indication of when the caps are in the open and/or the closed position.

11. The cap assembly of claim 1, further comprising a pin to secure the lever in the closed position.

12. A fluid fitting assembly comprising:

two fluid fittings and a cap assembly as claimed in claim 1;

wherein the assembly is mounted to the two fluid fittings such that the hinge region is positioned between the two fluid fittings and in the closed position, each cap covers and closes a respective one of the two fluid fittings.

13. A fluid system comprising a fluid fitting assembly as claimed in claim 12, arranged to fluidly connect two parts of the fluid system.

14. The fluid system of claim 13 being a water system, the fluid fitting assembly for connecting a fluid tank to fluid lines from other parts of the system.

15. The fluid system of claim 14 being a potable water system for an aircraft.

* * * * *